Feb. 24, 1953 C. M. TUTTLE ET AL 2,629,304
APPARATUS FOR PROCESSING FILM
Filed June 24, 1948 6 Sheets-Sheet 2

CLIFTON M. TUTTLE
RALPH E. KLAUSS
INVENTORS

BY
ATTORNEYS

Feb. 24, 1953     C. M. TUTTLE ET AL     2,629,304
APPARATUS FOR PROCESSING FILM
Filed June 24, 1948     6 Sheets-Sheet 3

CLIFTON M. TUTTLE
RALPH E. KLAUSS
INVENTORS

BY
ATTORNEYS

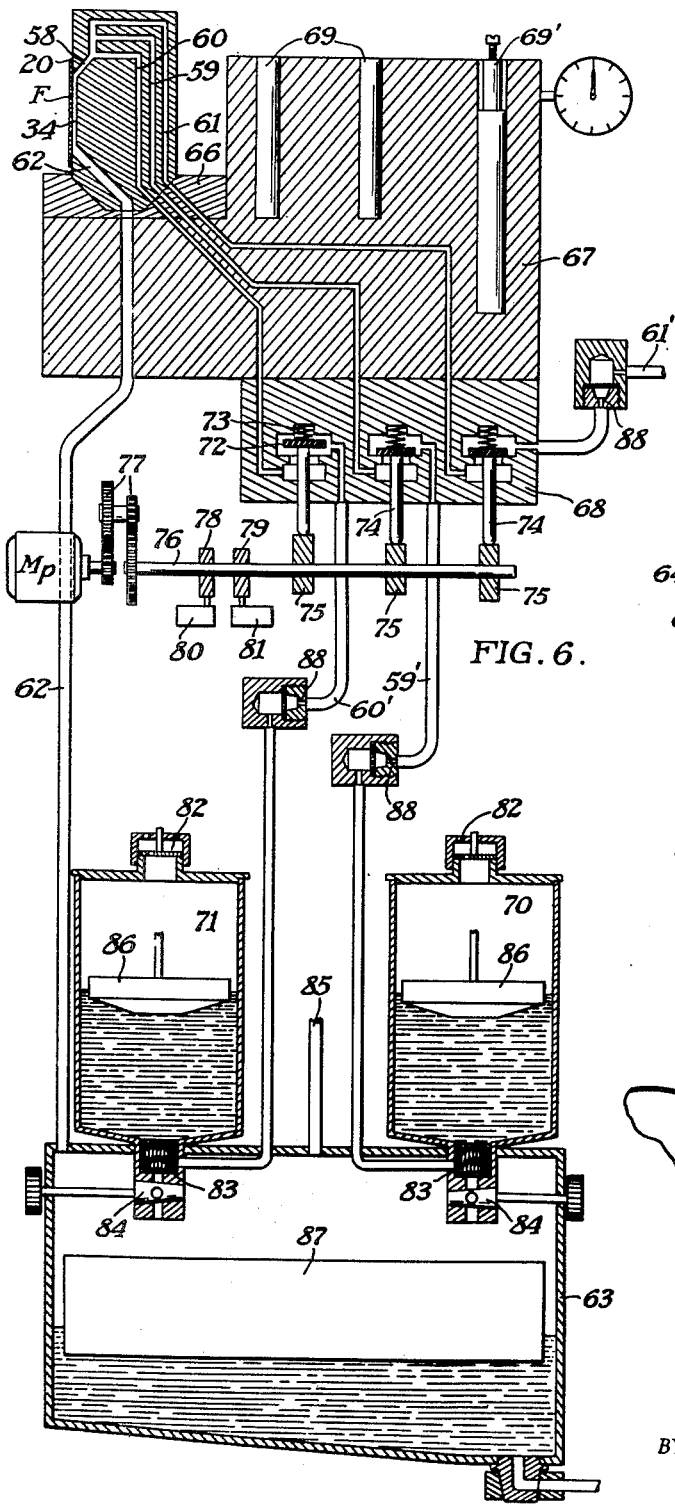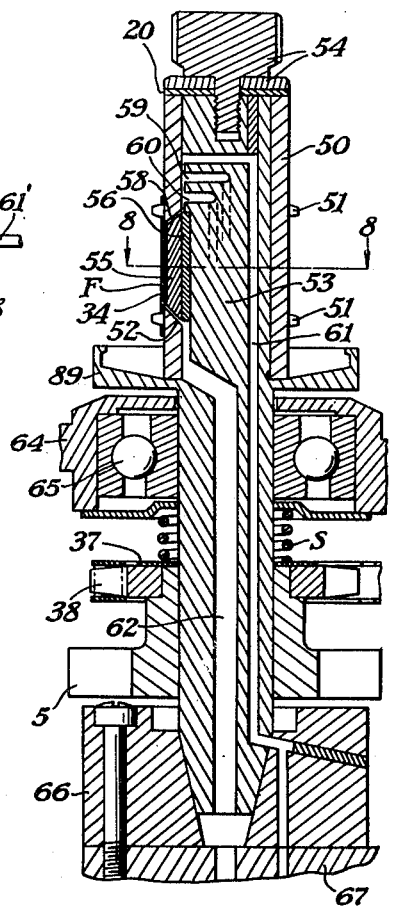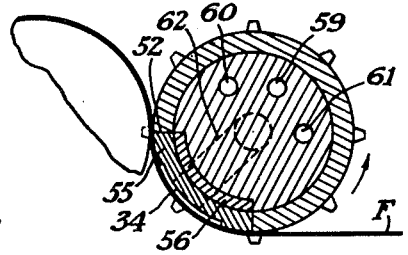
CLIFTON M. TUTTLE
RALPH E. KLAUSS
INVENTORS
BY
ATTORNEYS Feb. 24, 1953        C. M. TUTTLE ET AL        2,629,304
APPARATUS FOR PROCESSING FILM
Filed June 24, 1948                    6 Sheets-Sheet 5
FIG. 9.
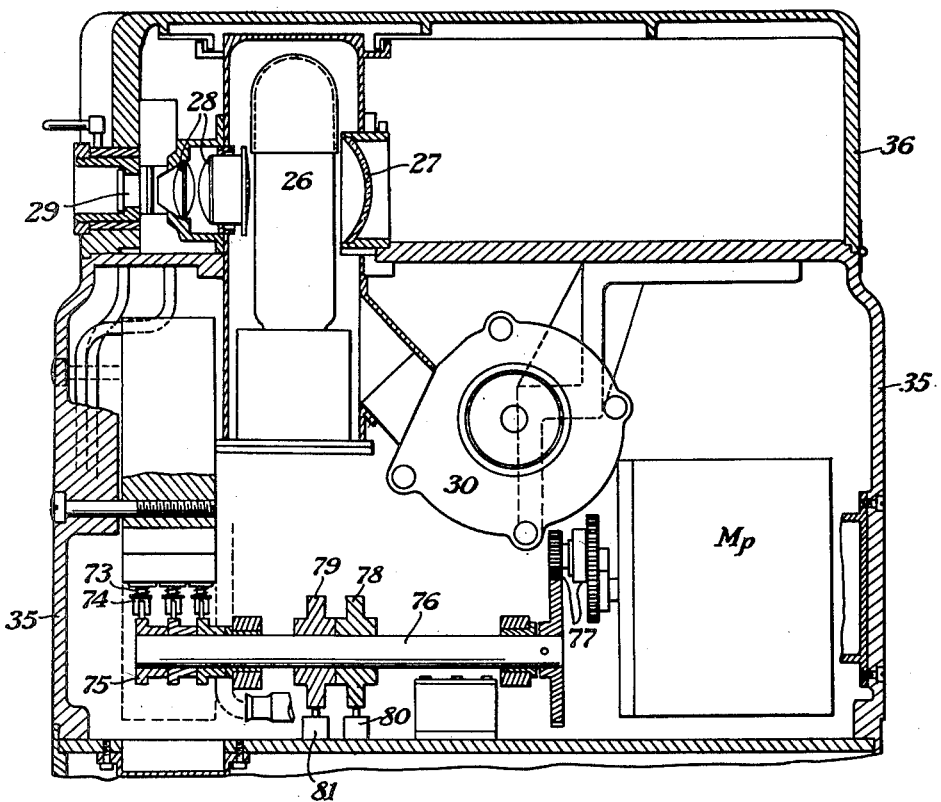
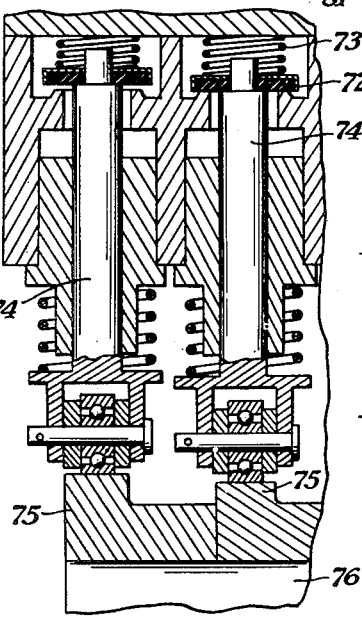
FIG. 11.
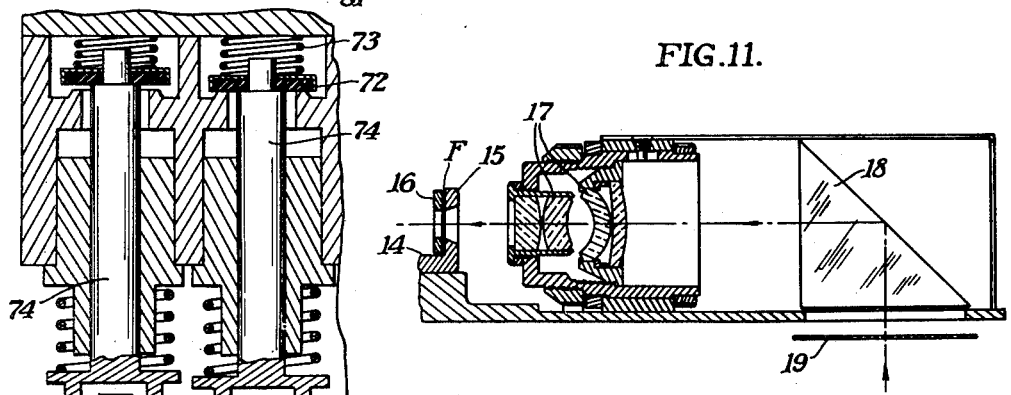
FIG. 10.
CLIFTON M. TUTTLE
RALPH E. KLAUSS
INVENTORS
BY
ATTORNEYS Patented Feb. 24, 1953

2,629,304

UNITED STATES PATENT OFFICE 2,629,304

APPARATUS FOR PROCESSING FILM

Clifton M. Tuttle, Huntington Station, and Ralph E. Klauss, Rochester, N. Y., assignors to Eastman Kodak Company, Rochester, N. Y., a corporation of New Jersey Application June 24, 1948, Serial No. 35,003

10 Claims. (Cl. 95—94)

The present invention relates to photography and particularly to apparatus for processing an exposed light-sensitive film in a very rapid manner.

For disclosure purposes, the present invention is shown in conjunction with a photographic recording apparatus similar in function to that disclosed and claimed in copending application Serial No. 600,250, filed June 19, 1945, in the names of C. M. Tuttle et al., which issued August 10, 1948, as U. S. Pat. No. 2,446,668, the present invention constituting a very important part of said apparatus and being an improvement over the processing component disclosed in said noted application. Although this processing component is shown in conjunction with a recording apparatus specifically developed for recording the radar images as they appear in the cathode ray screen of a radar receiver, it will be apparent that the present invention is not limited to use in connection with such a recording apparatus, but is capable of a use independent of such an apparatus, or with other types of photographic apparatus.

The purpose of the photographic recording apparatus of which the present apparatus for processing of film and constituting the present invention forms a part, is to photographically integrate and record the images of a radar scope, process the exposed film, and project an enlarged image of the record on a vertical screen with a minimum of elapsed time. This cycle is repeated continuously and each cycle overlaps the next, so that while one frame is being exposed, another is being processed and still another is being projected on the screen. Inasmuch as the present invention relates to the film processing component of the complete recording apparatus, only so much of the entire apparatus will be described as is necessary to point out the purpose and function of the processing component.

One object of the present invention is to provide apparatus by the use of which an exposed area of light-sensitive film can be processed in a very rapid time, actually within seven seconds.

Another object is to provide apparatus for processing the exposed area of a film which makes use of hot processing solutions to speed up the processing time, and in which small measured quantities of different processing solutions, and/or air, are successively flowed across the exposed film area in succession to effect the processing operation.

Another object is to provide apparatus in which the processing solutions are flowed vertically downward across the emulsion surface of the film only in succession to be followed by a stream of air whereby the problem of agitation of the processing solutions is eliminated and the problem of drying the processed film is reduced to a minimum.

And, a further object is to provide an apparatus for processing film wherein the flow of the solutions and air over the exposed film surface is effected by placing the solutions and air in a closed piping system under a vacuum, and wherein the film strip forms a component of said piping system so that when a film is not properly situated in processing position, the solutions cannot flow. Accordingly, the problem of spilling and wasting processing solutions is entirely eliminated.

And, another object is to provide a processing apparatus of the type set forth which is conducive to automatic operation.

Another object is to provide a processing apparatus of the type set forth in which a film-feeding or guiding sprocket constitutes a part of the processing apparatus, said sprocket being provided with an aperture in its periphery over which the film to be processed is wrapped to form a conduit between the emulsion surface of the film and an insert in the sprocket behind said aperture through which the processing solutions are fed.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which:

Fig. 6 is a schematic view showing the complete processing component constituting the present invention;

Fig. 7 is a vertical sectional view, on a greatly enlarged scale, showing the actual construction of the processing sprocket;

Fig. 8 is a horizontal section taken substantially on line 8—8 of Fig. 7;

Fig. 9 is an end view of the complete apparatus, partly in section, and showing the projection system, and particularly the valves and drive therefor, constituting a part of the processing component;

Fig. 10 is an enlarged sectional detail showing the construction of the valves in the pipe lines of the processing solutions and air;

Fig. 11 is an enlarged sectional detail showing the optical path and components of the reflex-type camera system forming a part of the complete apparatus.

Like reference characters refer to corresponding parts throughout the drawings.

Figure 1:
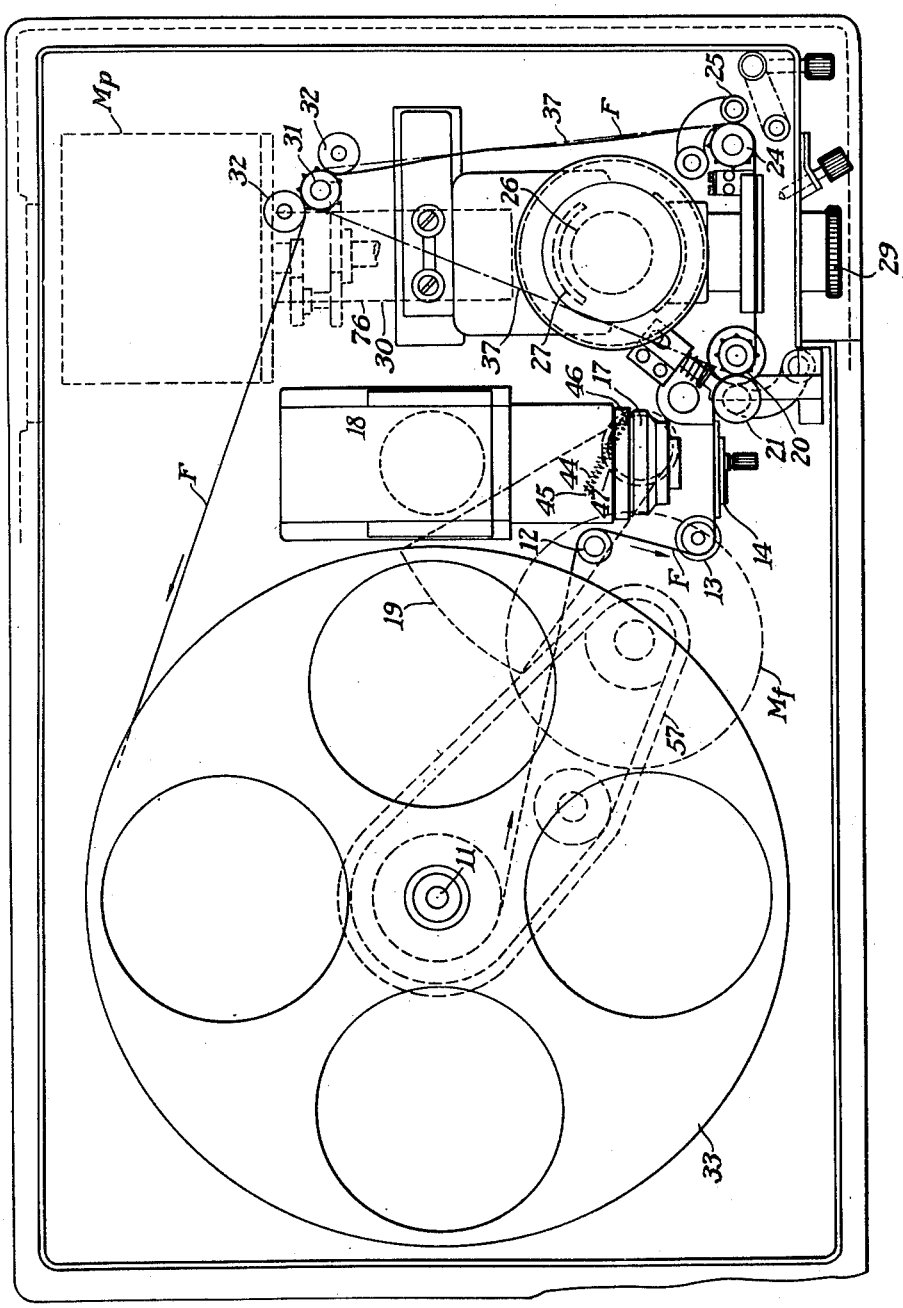
Fig. 1 is a top plan view of a complete recording apparatus, a part of which the film processing component, constituting the present invention, forms a part.
Figure 2:
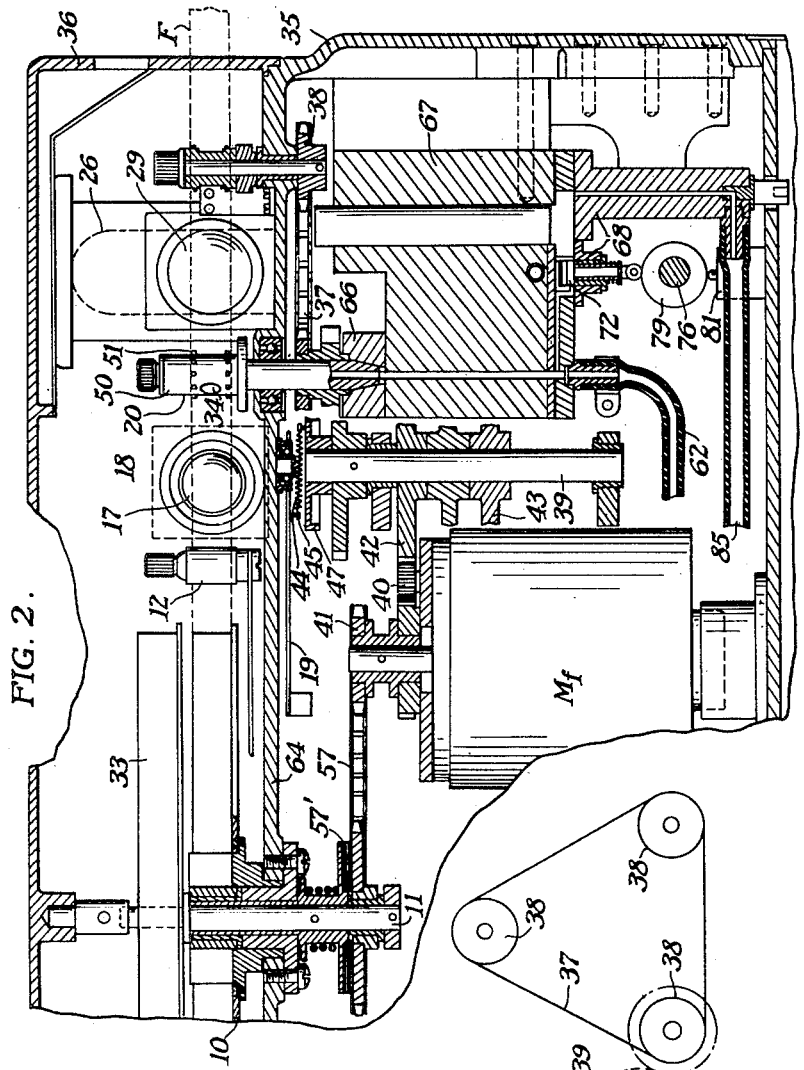
Fig. 2 is a partial front elevational view, partly in section, of the film-advancing mechanism of the complete apparatus and showing a preferred embodiment of the present invention which forms a part thereof.
Figure 3:
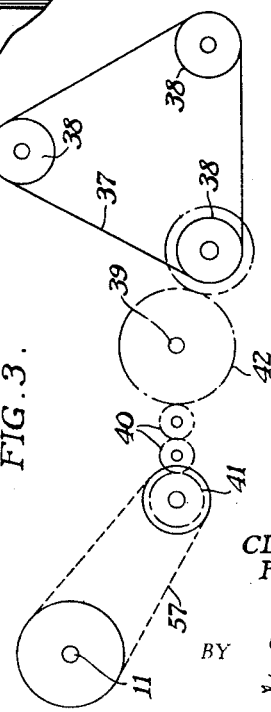
Fig. 3 is a schematic view of the driving means for the film-feeding sprockets and the take-up reel.

Referring to Figs. 1, 9, and 11, a general description of the structure and operation of the complete recording apparatus will be described in order to bring out the purpose and function of the processing component thereof which constitutes the present invention.

A perforated light-sensitive film F is fed in the direction of the arrow from a supply reel 10 mounted on a reel-supporting spindle 11 and successively over snubbing roller 12 and guide roller 13 and thence into the film or camera gate 14. As more clearly shown in Fig. 11, this camera gate comprises a fixed aperture member 15 against which the film is pressed by a hinged, spring-loaded gate member 16 to hold it flat in the focal plane of a camera objective 17. Behind the camera objective there is disposed a right-angle prism 18 which directs the image of the radar scope (not shown) into the objective, thus making the camera system a reflex one. Adjacent the light-entering face of the prism is a pivoted shutter 19 which moves to and from light-intercepting relation with the camera beam to control the exposure of the film. The shutter is controlled by a mechanism operating in timed relation with the film advance mechanism and the antenna driving mechanism of the radar equipment so that the shutter remains closed when the film is advancing and is opened for exposure when the film is stationary and during the time it takes the radar antenna to make one complete sweep, or revolution.

Upon leaving the camera gate the film F passes around a processing sprocket 20 and in a 90 degree wrapped relation with which it is held by the combined actions of a pivoted pressure roller 21 and a spring-pressed film shoe 22. From the processing sprocket the film passes through the projection gate 23 and then over a tension sprocket 24 which, because of a built-in spring (not shown) keeps the film taut in the projection gate. Film is held on the tension sprocket by a pivoted pressure roller 25. Behind the projection gate there is a film-illuminating system comprising a lamp 26, a mirror 27, and a condenser system 28, and the illuminated frame of film is imaged on a projection screen (not shown) in enlarged form by a projection lens 29, see Fig. 9. The lamp and remainder of the illuminating system is constantly cooled by a blower 30 directed into the base of the lamphouse upwardly from the bottom.

After leaving the projection gate, the film passes around a feed sprocket 31 in wrapped relation with which it is held by a pair of guide rollers 32 and thence to a take-up reel 33 mounted on a reel spindle 11 above and coaxially disposed relative to the supply reel 10. There is slack in the film path between the tension sprocket 24 and the feed sprocket 31.

Each time the film advance mechanism is actuated, the frame of film that was exposed at the camera gate advances to the aperture 34 in the hub of the processing sprocket for a processing operation, and the frame that was processed at the processing sprocket advances to the projection gate and is projected on the screen. During each film advance, the three film sprockets make exactly one turn. The processing sprocket 20 is also the registration sprocket. Registration of the image on the projection screen is dependent upon the indexing of this sprocket. The tension sprocket 24 maintains a constant tension on the film in the projection gate and insures a positive seal around the aperture 34 in the processing sprocket 20.

All of the film-feeding mechanism is located in a light-tight housing atop a cabinet 35, see Fig. 9, which is adapted to house the film-feeding mechanism, the processing solution tanks, the radar scope and associated unit, etc. As shown in Fig. 9, this light-tight housing may be provided with a removable cover 36 which has a light-tight connection with the top of the cabinet proper. The usual and necessary controls are included in the control circuit of the apparatus for automatically shutting off the complete apparatus when, for any reason, there is no film advancing through the sprocket assembly when the film is exhausted, or breaks, etc., said controls consisting of suitable micro switches, or other means. However, since these control features constitute no part of the present invention, they have been omitted from the disclosure.

Referring now particularly to Figs. 2–6, the driving mechanism for the film advance sprockets will be described. First of all, the processing sprocket 20, the tension sprocket 24, and the feed sprocket 31, are connected together by a chain 37, engaging chain sprockets 38 on the lower end of each thereof, see Fig. 3. Each of the chain sprockets 38 are of the same size so that each of the film sprockets rotate at the same rate. The film advance motor $M_f$ drives a film-advance cam shaft 39 through two idler gears 40, connecting together a pinion 41 on the motor shaft and a spur gear 42 on the cam shaft. This cam shaft makes one complete revolution and then a cam 43 thereon opens a switch 43' which shuts off the film-advance motor. The film-advance motor also drives the take-up spindle assembly by means of a chain 57. Constant torque is maintained on the take-up spindle through a friction over drive 57'.

Figure 5:
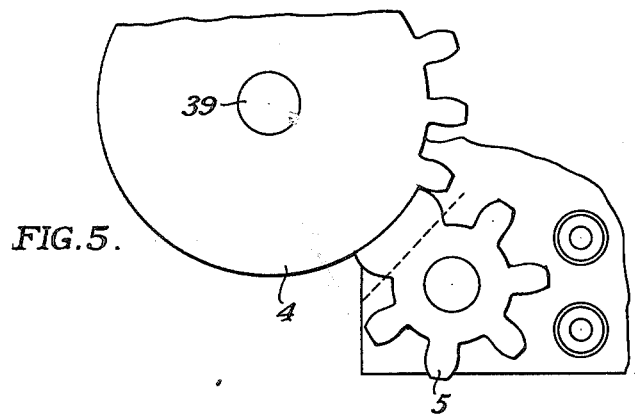
Fig. 5 is an enlarged detail of the processing sprocket drive showing how the same is accurately indexed to proper position for the processing step and is held in said indexed position for a given time.
Figure 4:
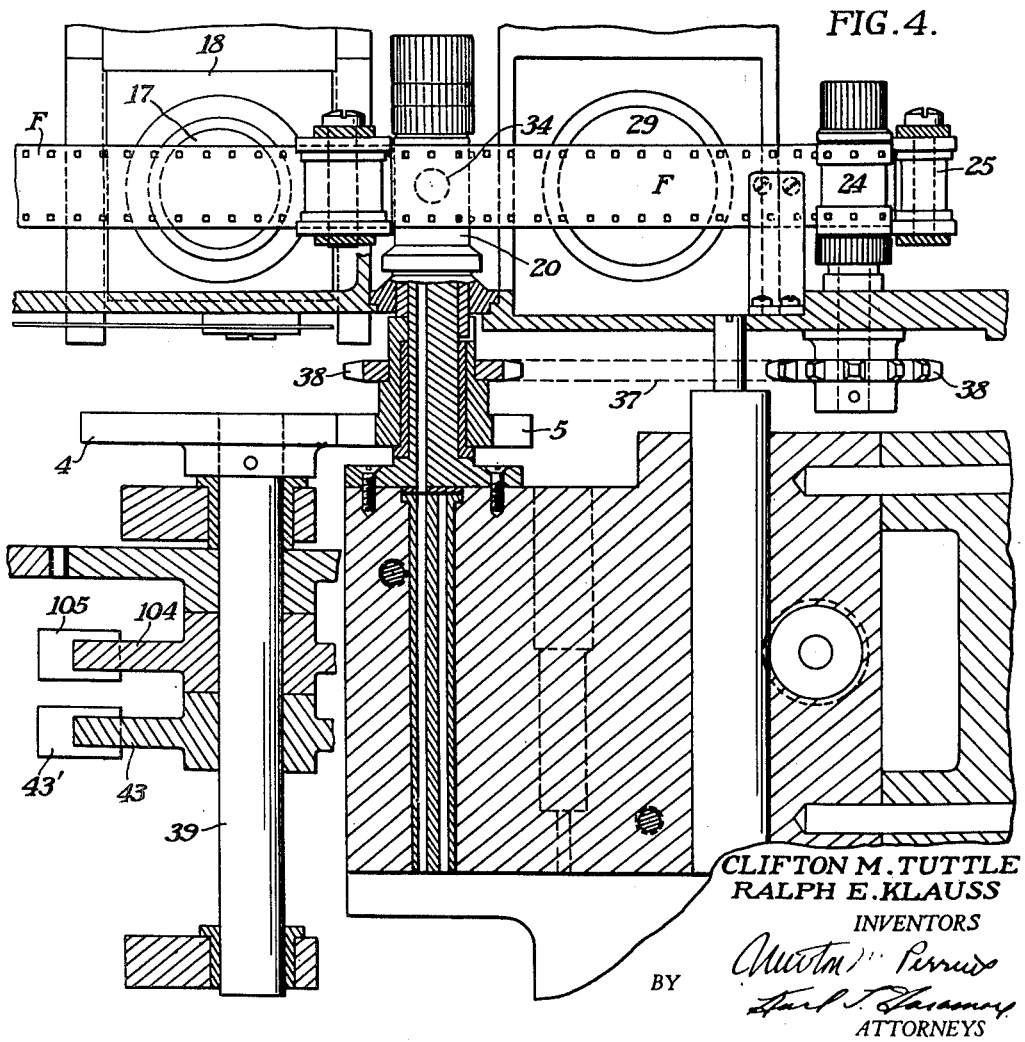
Fig. 4 is an enlarged sectional view of the right-hand portion of Fig. 2 and showing the drive for the processing sprocket, the fluid conduits associated therewith, and the heating blocks through which the processing solutions pass.

During the first half-turn of the film-advance cam shaft 39, the processing sprocket 20 makes one revolution by means of intermittent gears 4 and 5 connected to the cam shaft and sprocket respectively, and as particularly shown in Fig. 5, thus advancing the film. This film advance is so calculated that it moves the area of film, exposed at the camera gate, into registration with the aperture 34 in the processing sprocket for processing and, at the same time, moves the previously processed area of film into the projection gate 23 for projection on the screen.

The shutter 19 is opened and closed by a tension spring 44 having one end connected to a pin 45 on the shutter, and the other end connected to a pin 46 located eccentrically of a cam member 47 fixed to the cam shaft 39. As the cam member 47 rotates, the line of action of the spring 44 is shifted from one side to the other of the shutter's center of rotation, thereby causing it to open and close, or, more accurately to move to and from intercepting relation with the optical axis of the camera objective. Cam member 47 controlling the operation of the shutter is associated with the film-advancing mechanism so that during the last part of the film advance, the shutter is opened and a cam on the shutter shaft opens a switch 48, shown only in the control diagram of Fig. 12, which is in series with a switch 80 on the processing cam shaft, to be later described, so that when both of these switches are closed, the film advance can again start.

Suitable means are provided between the shutter and driving mechanism for the radar antenna to hold the shutter open until the antenna has made a complete sweep, or revolution. However, since this means forms no part of the present invention, it will not be described herein, except so far as its effect on the control of the switch 48 has already been explained.

Referring now particularly to Figs. 6-10, the processing component of the apparatus and which constitutes the present invention will now be described. Considering first the structural details of the processing sprocket 20, shown in Fig. 7, this sprocket comprises a hollow drum portion 50 having teeth 51, spaced about its hub, or periphery, for engaging the marginal perforations of a film F wrapped therearound. The wall of the drum portion is provided with an aperture 52. The drum portion 50 of the sprocket has a lapped fit with a spindle portion 53 and is held in assembled relation thereon by a screw knob, washer, and gasket combination 54.

Disposed in the aperture 52 in the sprocket drum 50 is an insert 55 which is backed up by a spacer member 56 engaging the spindle portion 53. The outside face of this insert 55 is provided with a recess 34, see Fig. 8, having an area corresponding to that of the exposed area of the film and a depth of about .005 of an inch. Accordingly, when the film F is wrapped around the sprocket drum 50 with the exposed area in overlapping relation with the recess 34, there is formed a channel .005 of an inch deep through which processing fluids may be passed in a thin stream over and across the film surface. The upper end of the recess 34 is continued to connect with a channel 58 between the drum and spindle which is, in turn, connected with three separate feed lines, 59, 60, and 61, for developer solution, fixer solution, and air, under pressure, respectively. The lower end of the recess 34 is connected with an exhaust line 62 running longitudinally of the spindle and which, in turn, is connected to a sump tank 63.

The sprocket spindle and the drum associated therewith are rotatably mounted in a mechanism plate 64 of the apparatus by a ball bearing 65 and the lower end of the spindle has a tapered lap fit with a block 66 adapted to be heated to, in effect, form a valve. The drive sprocket 38 and intermittent gear 5 have drive fits with the lower end of the sprocket spindle. When the processing sprocket is indexed to its processing position, the three feed lines 59, 60, and 61 therein are lined up with three corresponding feed lines 59', 60', and 61', passing through a metal block shown herein as composed of three parts 66, 67, and 68 for assembly purposes, which are heated to a temperature between 140° and 150° F. by electric heating elements 69 embedded in the block and controlled by a thermostatic switch 69'. The tapered end of spindle 53 is pressed into engagement with the valve seat in block 66 by a compression spring S.

Referring now particularly to Figs. 6, 9, and 10, the feed lines 59', 60', and 61' are connected with a tank 70 containing developer solution, a tank 71 containing fixing solution, and a source of air, under pressure, for example an air compressor, not shown, or air under atmospheric pressure only, respectively. Each of the three feed lines include a spring-actuated poppet valve 72 which, as best shown in Fig. 10, are normally closed by springs 73, and the ends of the valve stems 74 have rollers connected thereto engaging a cam 75 on a cam shaft 76 which act to open the valves. As shown in Fig. 6, cam shaft 76 includes three cams 75, one for operating each valve in proper timed relation to secure processing of the exposed film area wrapped around the processing sprocket. This cam shaft is driven through a reduction gearing 77 from a processing motor $M_p$; the cam shaft 76 also includes two other cams, 78 and 79, which serve to operate switches 80 and 81 for purposes to be described hereinafter.

As clearly shown in Fig. 6, the developer and fixing tanks are at atmospheric pressure during operation because of the vents 82 in the caps thereon. Solutions are drawn into the lines 59 and 60 through strainers 83 and each tank is provided with a hand valve 84 so that it can be drained into the sump tank. Constant vacuum is maintained in the sump tank during operation by the line 85 which is connected to a vacuum pump, not shown. Each of the developer and fixer tanks includes a float 86 which serves to indicate in any suitable manner when the solutions are too low, while the sump tank includes a float 87 which serves to indicate when this tank is almost full.

Inasmuch as the fluid-feeding system is under a vacuum, it will be readily understood that should there be no film over the aperture or recess 34 in the processing sprocket, the vacuum on the system will be broken and the fluids will not feed, even though the processing motor is operating to open the valves in the feed lines. Placing the fluid-feeding system under a vacuum is desirable because it makes the presence of a film on the processing sprocket in proper registration with the aperture 34 necessary to a flow of the treating fluids. It will thus be seen that should the film break, become exhausted, or for any other reason fail to properly seal the aperture 34 in the processing sprocket, then the vacuum system will be broken and the solutions will not feed and become wasted or flood the apparatus. So far as the broader aspects of the present invention are concerned, however, the treating fluid feeding system could be operated under pressure rather than a vacuum. The only advantage lost would be the necessity of the film properly sealing the aperture 34 in the processing sprocket to secure a feed of the fluids.

Each of the feed lines 59', 60' and 61' for the fluids includes an interchangeable restricted orifice 88, including a strainer, by means of which the amount of fluid flowing through the lines in a given time may be regulated to obtain the desired processing action on the film. These orifices are so selected, along with the speed of the vacuum pump, that just enough of each of the fluids will flow over the film surface in the time allotted by the cams on cam shaft 76 to obtain proper treatment of the film. Too little of the solutions results in the film not being sufficiently processed, while an excess of the solutions is wasteful. Referring to Fig. 7, the spindle 53 of the processing sprocket 20 includes a trough portion 89 to catch any solution which might accidentally leak between the film and the aperture 34. Any solution caught in this trough will be drawn into the exhaust line 62 because the metal-to-metal contact between the trough and the sprocket drum will allow a slight leakage, but not enough to destroy the vacuum system on the lines.

At the end of the film advance, the processing motor $M_p$ is turned on by switch 105 operated by a cam 104 on the cam shaft 39. This motor rotates the processing cam shaft 76 one complete turn and then it is shut off by cam switch 81. During this single revolution, which may be as short as seven seconds, a complete processing cycle occurs. The three poppet-type valves which are operated by cams 75 meter the developer, fixer, and air that are fed into the processing sprocket and across the exposed frame of film wrapped therearound. The heater block is kept at a constant temperature of 140°–150° F. by the plurality of electric heating elements controlled by a thermo switch. As the solutions and air pass through the block and into the processing sprocket, they are heated to the proper temperature for fast processing. The processing cycle which we have found suitable with this apparatus is as follows:

| | Sec. |
|---|---|
| Developer: | |
| Valve open | 1.5 |
| Valve closed | 0.5 |
| Fixer: | |
| Valve open | 1.9 |
| Valve closed | 0.2 |
| Developer: | |
| Valve open | 0.4 |
| Air: | |
| Valve open | 2.5 |
| Total cycling time | 7.0 |

It will be noticed that the fixing solution is removed from the film by a second application of developer solution, rather than with water, as is common practice. This eliminates the necessity of a separate tank and line for water, thus simplifying the apparatus, and, at the same time, provides a processed film of adequate keeping qualities. The air is used for both removing superfluous liquid from the film surface and to dry the film prior to projecting. By this method of applying the treating fluids to the film, the problem of agitation is entirely eliminated, and the drying load is reduced to a minimum because only the emulsion surface of the film is wet.

Figure 12:
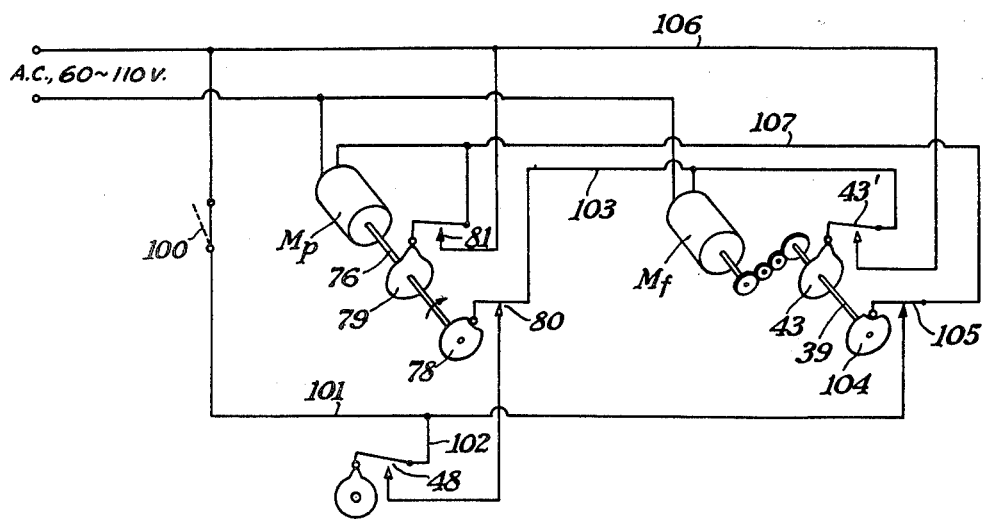
Fig. 12 is a schematic drawing of the operating control circuit of the photographic recording apparatus as a whole.

Referring now to Fig. 12, the operating circuit for the apparatus which concerns the present invention will now be described. This circuit controls the film advance, processing, and exposure cycles, when the apparatus is in actual operation. In normal continuous operation, the processing and film advance motors $M_p$ and $M_f$ respectively operate alternately with the operating switch 100 in the "on" position shown, wires 101 and 102 are energized. If the shutter switch 48, controlled by a cam on the shutter shaft, is closed, wire 103 is energized through switch 80 operated by cam 78 on the cam shaft 76 driven by the processing motor $M_p$, thereby starting the film advance motor $M_f$. As the film advance motor turns, switch 43', controlled by a cam 43 on the cam shaft 39, connects wire 103 to wire 106 which is continuously energized from the load side of the 60-cycle, 110 v. supply. This keeps the film advance motor running until the switch 43' is again opened by cam 43 or after one revolution of the cam shaft 39.

After the intermittent gear 5 has completed the actual film advance, cam 104 on cam shaft 39 allows switch 105 to close and energizes wire 107 through wire 101, thereby starting the process motor $M_p$. The process motor continues to run for one complete cycle by keeping itself energized through its cam switch 79—81, as above explained for the film advance motor. After the process cam switch 81 closes, cam switches 80 and 105 open, disconnecting wires 102 and 101 from the motors. As both motors revolve, cam switch 43' opens and stops the film advance motor.

The camera shutter 19 has been cocked open by the film advance and when the shutter is open, the shutter switch 48 is open. The shutter and shutter switch 48 reclose only after the radar antenna has made one complete revolution. This may occur before or after the process cam shaft 76 has completed its revolution, depending upon the speed of the antenna. Just before the process motor $M_p$ stops, cam switch 80 closes, connecting wire 102 to 103. The film advance motor $M_f$ will start on the next cycle whenever both the shutter switch 48 and the process cam switch 80 are closed. If the radar antenna is rotating slowly, the cycling of the unit will be determined by the antenna speed, but if it is rotating rapidly, the photographic repeater unit will cycle at its own rate determined by the processing time.

It will be apparent from the above description that by the use of the processing component constituting our invention successive exposed areas of a light-sensitive film can be rapidly and efficiently processed in a manner which requires no manual supervision and/or manipulation but is conducive to automatic operation. So far as we are aware we are the first ones to process a film while it is held on the periphery of a feeding sprocket or drum by flowing solutions in a thin stream transversely across the emulsion surface of the film only. By so applying the processing solutions to the film surface the problem of agitation is eliminated. Likewise the problem of drying the processed film is reduced to a minimum. By placing the fluid feeding system under a vacuum, as we have done, a film strip must be in proper position on the processing sprocket or drum before the fluids can be fed. This eliminates the danger of the apparatus being accidentally flooded should the film break or become exhausted. The valve and valve seat cooperation between the bottom of the sprocket spindle and the block 66 makes it necessary that the processing sprocket be indexed to its stationary or processing position before the fluid feeding system can be completed for operation.

Although we have shown and described certain specific embodiments of our invention, we are fully aware that many modifications thereof are possible. Our invention, therefore, is not to be limited to the precise details of construction shown and described but is intended to cover all modifications coming within the scope of the appended claims.

Having thus described our invention, what we claim is new and desire to secure by Letters Patent of the United States is:

1. An apparatus for processing an exposed light-sensitive film strip a frame at a time comprising a processing drum provided with a recess in its periphery corresponding in configuration to the frames of the film strip, means for holding said film strip in wrapped relation on the periphery of said drum to provide a fluid-tight seal between the film strip and the recess and with a frame in alignment with said recess and with the emulsion surface facing said recess, a conduit for processing fluids extending longitudinally through said drum and including said recess intermediate its ends, a reservoir of processing fluid, a feed line connecting said reservoir with the entering end of said conduit, and means for creating and maintaining a suction in said fluid feeding system in the direction of said exhaust line whereby operation of said fluid feed system depends upon a film strip being in covering relation with said recess in the processing drum.

2. An apparatus for processing an exposed light-sensitive film strip a frame at a time comprising a processing drum provided with a recess in its periphery corresponding in configuration to the frames of the film strip, means for holding said film strip in wrapped relation on the periphery of said drum to provide a fluid-tight seal between the film strip and the recess and with a frame in alignment with said recess and with the emulsion surface facing said recess, a conduit for processing fluids extending longitudinally through said drum and including said recess intermediate its ends, a supply reservoir of processing fluid, a feed line connecting said reservoir with the entering end of said conduit, a sump tank, a feed line connecting the exhaust end of said conduit with said sump tank, and means for evacuating the air space in said sump tank to a pressure below that in the air space in said reservoir to place the fluid feed system under a vacuum, whereby the operation of said fluid feed system depends upon a film strip being in covering relation with said recess in the processing drum.

3. A film processing apparatus according to claim 2, including a plurality of reservoirs of different processing fluids, individual feed lines from each of said reservoirs to the entering end of said conduit, a valve in each of said feed lines controlling the instigation and duration of flow of each of the fluids to said conduit, and power-driven means for controlling the operation of said valves in timed relation to supply the proper amounts of the processing fluids to the process drum in the proper sequence to effect processing of the film.

4. A film processing apparatus according to claim 2, in which the periphery of said drum includes teeth for engaging perforations in the margin of said film and in which said drum is rotatably mounted, and means for intermittently rotating said drum to advance the film and index successive frames thereof into alignment with said recess in the periphery thereof.

5. An apparatus for processing successive exposed frames on a length of perforated light-sensitive film comprising a rotatable processing sprocket having teeth on its periphery adapted to engage the perforations in the film, the periphery of said sprocket provided with a recess corresponding in shape and size to the exposed frames of film, means for holding said film in wrapped relation on the periphery of said sprocket with one of said exposed frames in fluid-tight covering relation with said recess and with the emulsion surface facing said recess, means for intermittently rotating said sprocket to advance the film and move successive exposed frames of the film into covering relation with said recess, a conduit for processing fluids extending longitudinally of said sprocket and including said recess intermediate its ends, a plurality of feed lines in said sprocket connected with one end of said conduit through which different processing fluids can be fed to said conduit, an exhaust line connected to the other end of said conduit through which the processing fluids may pass from the conduit after passing therethrough and across the surface of the film covering said recess, and means for feeding different processing fluids through different ones of said feed lines and to said conduit in proper succession and for proper duration to effect processing of the film frame in covering relation with said recess.

6. A processing apparatus according to claim 5, including means for rendering said last-mentioned fluid-feeding means inoperative while the sprocket is moving and until it is stopped in processing position with an exposed frame of film in proper covering relation with said recess.

7. A processing apparatus according to claim 5, in which said last-mentioned fluid-feeding means includes a plurality of stationary feed lines corresponding in number and disposition to those in the sprocket adapted to be connected with supplies of different processing fluids, and which stationary feed lines are adapted to be brought into substantially air-tight, liquid-conducting relation with the feed lines in the sprocket only when said sprocket is indexed to its processing position in which it is stationary.

8. A processing apparatus according to claim 5, including means for reducing the pressure on the exhaust line below that on the feeding lines so that the complete feeding system operates under a vacuum, whereby the presence of a film in fluid-tight covering relation with said recess forming a part of the feed system is necessary to operation of the fluid-feeding system.

9. A processing apparatus according to claim 5, in which said last-mentioned fluid-feeding means includes a plurality of supply reservoirs whose liquid levels are below that of the entering end of said conduit and which are under atmospheric pressure, a sump tank connected to said exhaust line for collecting the fluids after they pass through said conduit, means for evacuating the air from said sump tank to a pressure below atmospheric to place the complete fluid-feeding system under a vacuum upon which the feeding of the fluids is dependent, whereby the presence of a film in fluid-tight covering relation with said recess is necessary to operation of the fluid-feeding system.

10. A processing apparatus according to claim 5, in which said last-mentioned means includes a stationary metal block provided with a plurality of feed lines corresponding in number to said feed lines in said sprocket, said sprocket and said block having engaging surfaces cooperating in the nature of a valve and valve seat and having the ends of the feed lines in each of these parts disposed so as to come into registration when the sprocket is indexed to its stationary position.

CLIFTON M. TUTTLE.
RALPH E. KLAUSS.

REFERENCES CITED

The following references are of record in the file of this patent:

UNITED STATES PATENTS

| Number | Name | Date |
|---|---|---|
| 1,254,300 | Baker | Jan. 22, 1918 |
| 1,728,361 | Pifer | Sept. 17, 1929 |
| 1,907,252 | Debrie | May 2, 1933 |
| 2,111,759 | Douden | Mar. 22, 1938 |
| 2,194,345 | Winians | Mar. 19, 1940 |
| 2,446,668 | Tuttle et al. | Aug. 10, 1948 |
| 2,478,896 | Cobb | Aug. 16, 1949 |
| 2,492,133 | Cobb | Dec. 27, 1949 |